Sept. 29, 1970     A. BAEKKEN     3,531,066
VERTICAL LOAD TRANSFER
Filed March 3, 1969     4 Sheets-Sheet 2

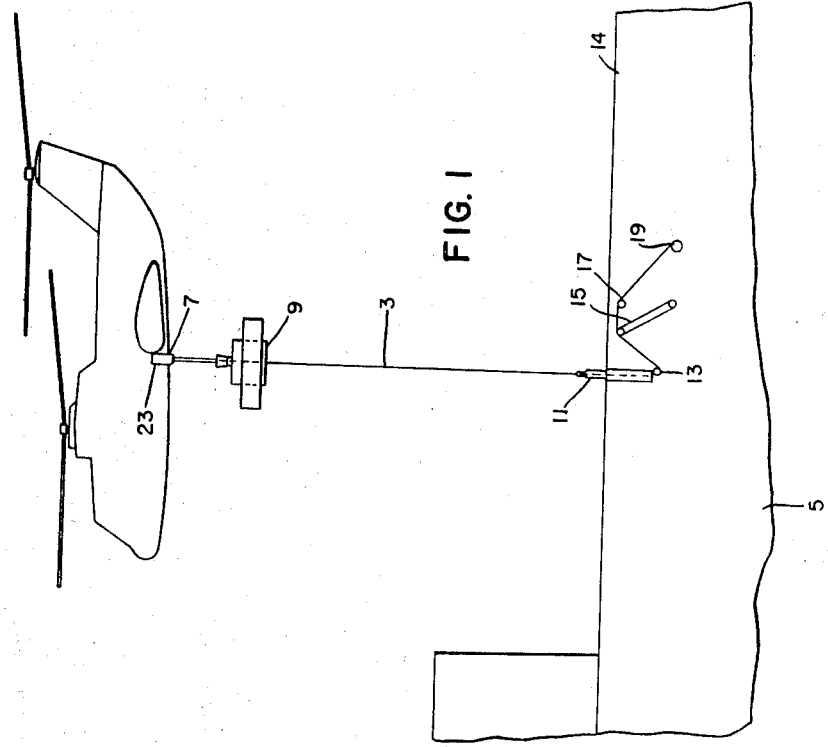
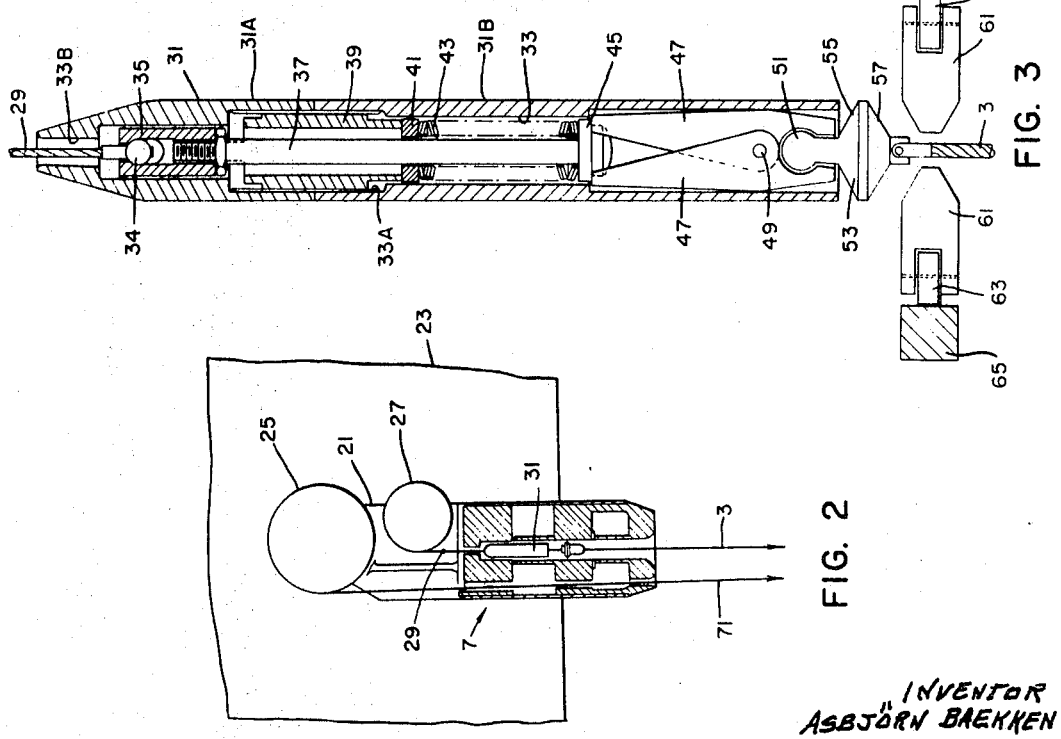
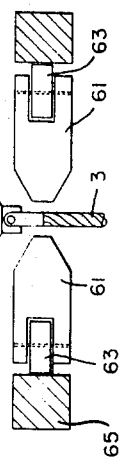

INVENTOR
ASBJÖRN BAEKKEN
BY CUSHMAN, DARBY &
CUSHMAN
ATTORNEYS

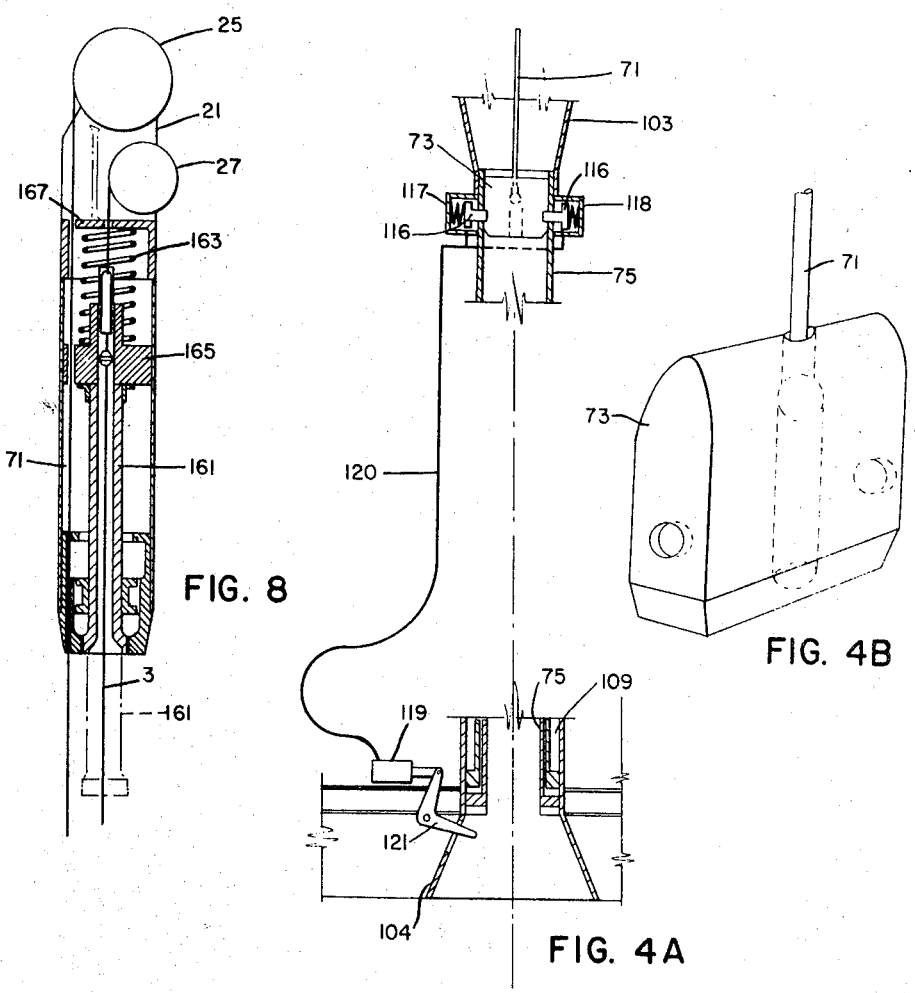

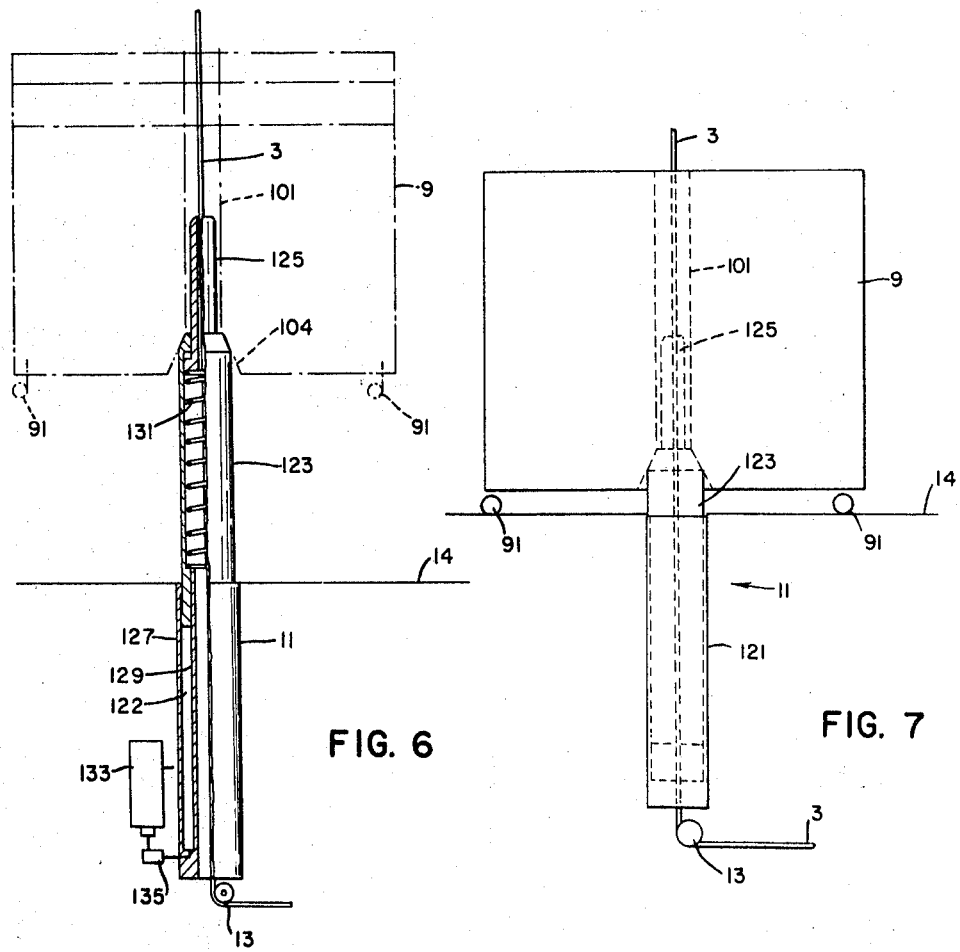

United States Patent Office 3,531,066
Patented Sept. 29, 1970

3,531,066
VERTICAL LOAD TRANSFER
Asbjorn Baekken, Dartmouth, Nova Scotia, Canada, assignor to Fairey Canada Ltd., Nova Scotia, Canada, a corporation of Canada
Filed Mar. 3, 1969, Ser. No. 803,881
Claims priority, application Canada, Mar. 5, 1968, 14,007
Int. Cl. B64d 1/00
U.S. Cl. 244—137                                              15 Claims

ABSTRACT OF THE DISCLOSURE

Transfer means to effect vertical transfer of a load between an upper station and a lower station with relative movement therebetween, praticularly between a helicopter and the deck of a ship at sea, comprising a coupling cable between the two stations, means for maintaining that cable at constant tension, a load carrier for movement between the stations while guided by the coupling cable, and at the lower station a receiving post to receive the load and position it against lateral movement even when the coupling cable is released.

---

The present invention relates to means for effecting the vertical (or substantially vertical) transfer of objects, more particularly stores, between an aircraft capable of hovering flight and an independent station, for example a ship at sea. The aircraft will normally be a helicopter, but the invention could also be applied to other aircraft capable of hovering flight.

In the transfer of stores between two ships through the medium of a helicopter, problems arise due to the adverse conditions which arise at sea, namely to the action of wind on both the ship and the helicopter, and to the wave action on the ship. The present invention arises from a study of the factors involved, and an object of the present invention is the provision of means for effecting the vertical transfer of objects in a safe manner despite unpredictable but limited vertical displacements between the upper and lower stations involved.

According to the present invention, means suitable for effecting the vertical or substantially vertical transfer of objects between an upper station and a lower station subject to unpredictable but limited relative vertical movements, comprise means adapted to tether the upper station to the lower station by a cable and to maintain that cable at a substantially constant tension despite the unpredictable but limited vertical movements between the two stations, a load carrier adapted to carry the objects to be transferred, guiding means on the load carrier by which the load carrier is caused to pass up or down the constant tension cable and is thereby restrained by that cable against lateral displacement, which means at the the upper station, a load cable carried by the winch means and readily connectible at its lower end to the load carrier to support the load carrier, and receiving means at the lower station to which the constant tension cable extends, the receiving means being adapted to receive the load carrier as the load carrier reaches the lower station and then to hold the load carrier against lateral displacement when the load cable and the constant tension cable are detached from the load carrier.

The invention will now be described, by way of example, with reference to the accompanying drawings, in which:

FIG. 1 is a schematic side elevation of the aft end of a ship and of a helicopter in flight but tethered by a cable to that ship;

FIG. 2 is a sectional side elevation of a fitting shown in FIG. 1 as secured to the helicopter;

FIG. 3 is a sectional side elevation, to a larger scale than FIG. 2, of a cylindrical coupling shown in FIG. 2;

Figure 4:
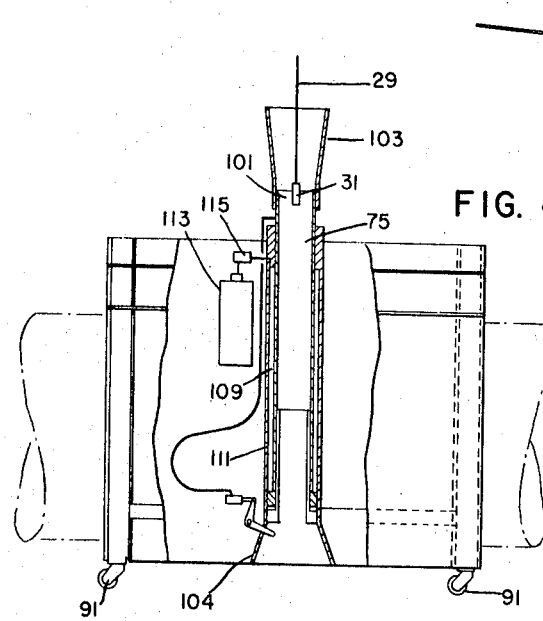
FIG. 4 is a side elevation of a cargo carrier shown in FIG. 1, the centre part being in section taken on line IV—IV of FIG. 5.
Figure 9:
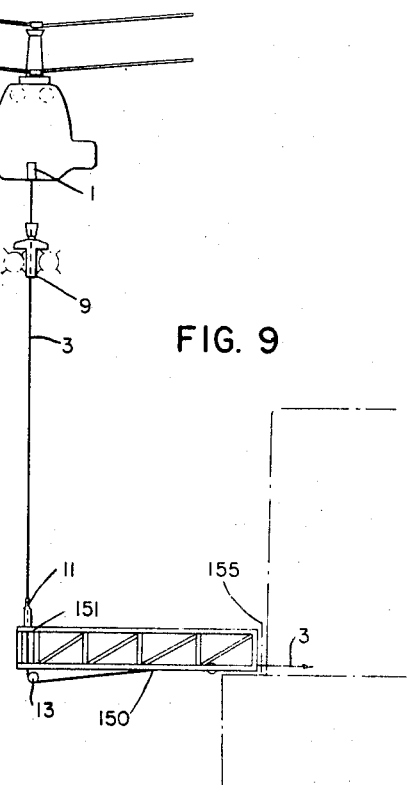
Figure 5:
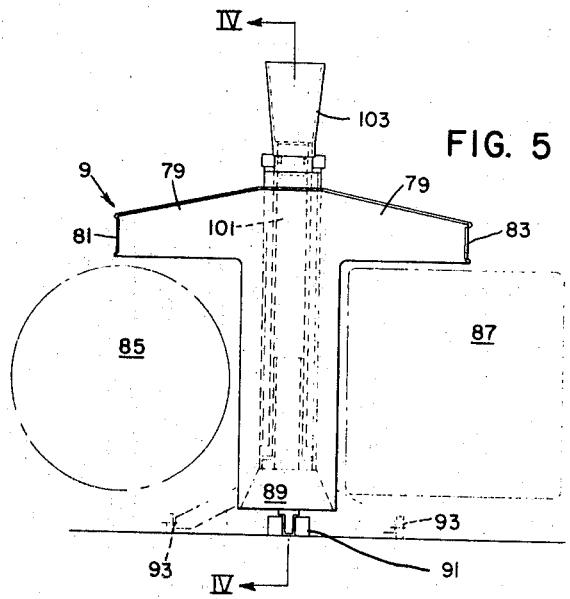

FIGS. 4A and 4B form a diagrammatic representation of a hydrostatic cargo cable release indicated in FIG. 4;

FIG. 5 (which is located on the same sheet as FIG. 4) is an end view of the cargo carrier shown in FIG. 4;

FIG. 6 is a sectional side elevation of a receiving post shown in FIG. 1;

FIG. 7 is a schematic representation of the receiving post of FIG. 6 in a second operating condition in which it is fully engaged with the load carrier of FIG. 4;

FIG. 8 is a sectional side elevation of a modified form of the fitting shown in FIG. 2; and FIG. 9 is a fore-and-aft view of a ship deck showing a modified arrangement of the receiving post of FIG. 7.

FIG. 1 illustrates a helicopter 1 actually in flight but tethered by a cable 3 to a ship 5. The helicopter is provided on its underside with a fitting 7, described below in detail with reference to FIG. 2, the cable 3 extending from the fitting 7 through a cargo carrier 9, described below in detail with reference to FIGS. 4, 4A and 5, to and through a receiving post 11, described below in detail with reference to FIGS. 6 and 7, the cable 3 then passing round a sheave 13 disposed below the deck 14 of the ship to a cable accumulator 15 and thence via sheave 17 to drum 19 of a winch provided with a control system arranged and adapted to keep the tension in the part of the cable 3 extending from the sheave 13 to the helicopter 1 substantially constant despite varying wind forces and despite absolute vertical displacement of the ship by wave action. One advantageous form of such a control system is illustrated in copending Canadian patent application No. 14,007 in the name of the present applicants.

Referring now to FIG. 2, the fitting 7 is in the form of a vertically arranged generally cylindrical housing 21 provided with fixing lugs (not detailed) by which it can be firmly clamped to the underside of the main fuselage structure 23 of the helicopter 1. Since this fitting is to support the full weight of a massive load to be lowered from the helicopter to the ship, and is at the same time to carry the tethering force transmitted from the cable 3 to the helicopter 1, both the fitting and its method of attachment to the helicopter must be able to carry these loadings with a suitable factor of safety.

Mounted on an upper part of the housing 21 is cargo cable, winch drum 25 together with a reversible hydraulic or electric motor (not shown) arranged for energization by the power supply of the helicopter and suitable reduction gearing connecting the motor rotor to the drum 25. Mounted on a part of the housing below and to one side of that carrying the drum 25 is a messenger cable winch drum 27 together with a reversible hydraulic or electric motor (not shown) and suitable gearing connecting the motor rotor to the drum 27.

Wound on the messenger cable drum 27 is a relatively lightweight messenger cable 29 terminating at its free end in a cylindrical coupling 31. The form of this coupling is shown more clearly in FIG. 3, from which it will be seen that the coupling 31 comprises an upper part 31A and a lower part 31B coupled together and formed with an axial bore 33 which, over the part 33A where the two parts are coupled together, has a larger diameter than does the bore at the upper end 33B. The bore at 33B has a diameter slightly larger than that of a coupling ball 34 disposed in a tubular fitting 35 disposed in the bore 33, which fitting is coupled to the messenger cable 29 and is screw-threaded internally to receive an upper end of a locking member 37. An adjusting sleeve 39 surrounds the upper portion of the locking member 37 and is externally screwthreaded to engage a complementary screw-thread on the bore part 33A. The lower end of adjusting sleeve 39 engages a ring 41 slidably mounted on the locking member 37 and biased upwardly by a compression spring means 43 acting between the ring 41 and a washer 45 butted against a head at the lower end of the locking member 37. As illustrated, the compression spring means 43 are formed by a stack of spring washers of the type known as Belleville washers. Two catches 47 are disposed inside the lower end of the bore 33 and are pivotally mounted on a transversely extending pin 49 carried by the coupling 31. The upper ends of the two catches 47 are engaged by the lower face of the washer 45, and the lower ends of the two catches are contoured to fit about a bulbous head 51 of an end fitting 53 secured to the upper end of the cable 3.

The end fitting 53 is formed below its bulbous head with an upwardly converging frusto-conical upper surface 55 and with a downwardly converging frusto-conical lower surface 57. The housing 21 is provided with a group of locking catches 61 arranged in a circle surrounding the upper part of the cable 3 immediately below the end fitting 53 when the messenger cable has been drawn upwardly until the cylindrical coupling 31 butts against the top of the fitting 7. The radially outer ends of these locking catches 61 are provided with roller cam followers 63 which engage an encircling multilobe cam ring 65 which can be rotated by motor means (not indicated) between an unlocked orientation in which the locking catches 61 can move radially outwards to a position such that the end fitting 53 can move freely past their inner ends, and a locked orientation in which the locking catches are firmly held inwards in a position in which the end fitting 53 cannot move past the catches.

Wound on the cargo cable winch drum 25 (see FIG. 2) is a cable 71 the lower end of which extends down through a vertical passageway in the housing 21 and which (see FIG. 4A) at its lower end carries a fitting 73 by which the cargo cable 71 can readily be connected to a cylindrical member 75 of the cargo carrier 9. As viewed from one end, i.e. as in FIG. 5, this cargo carrier 9 is T-shaped in section, and is provided near the outer end of each arm 79 of the T-shape with supporting means indicated diagrammatically at 81 and 83 respectively by which any desired two loads 85 and 87 can be carried. The vertical extent of these loads is such that they do not extend below the lower limit of the leg 89 of the T-shape, the lower end of this leg being provided with castering wheels 91 by which the cargo carrier 9 with its supported loads 85 and 87 can be wheeled across the deck 14 of the ship after landing. Preferably additional retractable wheels 93 are also provided which will restrain the landed cargo carrier against lateral tilting.

The cargo carrier 9 is formed with a vertically extending central passage 101 terminating at its upper end with an upwardly divergent flexible entry fitting 103 adapted to fit about a complementary part of the lower end of the fitting 7, and terminating at its lower end with an upwardly convergent funnel 104 adapted to receive the upper end of the receiving post 11. As will be seen from FIG. 4, the central passage 101 is defined by two telescoping cylindrical members, namely member 75 and a member 107, the upper member 75 carrying the fitting 103 and having an outwardly extending flange at its bottom end arranged to act as a ram in an annular cylinder 109 defined by a surrounding tube 111 carried by the cargo carrier 9 and by the member 75. A hydraulic accumulator 113 carried by the carrier 9 is arranged to supply hydraulic fluid under pressure to the cylinder 109 through an adjustable orifice device 115. The inner cylindrical member 75 is coupled through the fitting 73 to the cable 71, so that the weight of the cargo carrier is transmitted through the fluid in the cylinder 109, which acts as a snatch absorber and shock absorber. As will be seen in FIG. 4B, the fitting 73 is in the form of an oblong block having a rounded upper surface and having its lower corner chamfered on all sides, the two ends of the block being formed with bores into which can fit respectively two lockbolts 116. It will be seen that on each of the two longer sides of the fitting 73 a space is left free large enough for the messenger coupling 31 to pass the fitting. These bolts are biased inwardly by compression springs 117, but can be moved outwards against the action of the springs by fluid pressure actuators 118 supplied with pressure fluid from a cylinder 119 and a pipe 120. Cylinder 119 is coupled to one arm of a bell-crank lever 121, the second arm of which extends through a slot in the funnel 104.

Referring now to FIG. 6, the receiving post 11 comprises the combination of three telescopically arranged members, namely a main cylinder 122, a shock absorber ram 123, and a carrier guide 125. The cylinder 122 is provided with suitable mounting lugs (not shown) by which it is firmly bolted to the deck of the ship in a situation suitable for the deposit of the load carrier. The cylinder 122 is annular in form, being defined by a fixed outer wall 127 and a fixed inner wall 129, and the ram 123 is tubular in form with an enlarged lower end which acts as the actual piston in the annular cylinder. The upper end of the ram 123 is convergent upwardly so as to be complementary with the funnel 104 of the load carrier 9. The carrier guide 125 is tubular in form, having an enlarged lower end which stops it from passing upwardly out of the ram 123, and is biased upwardly by a compression spring 131 acting between the guide and a shoulder on the inside of the ram. The cable 3 extends downwardly through the carrier guide 125, the ram 123 and the open space encircled by the inner cylinder wall 129 to the sheave 13 and thence to the rope accumulator and the winch as described above with reference to FIG. 1. An accumulator 133 is arranged to supply hydraulic fluid under pressure to the cylinder 122 through an adjustable orifice device 135.

In use of the apparatus described above, the helicopter can be used to transfer stores from one ship equipped as described above, to another ship similarly equipped. Thus the helicopter hovers over the supply ship, on which the loaded cargo carrier 9 is positioned on the receiving post 11 with the weight of the loaded carrier supported on the deck 14 of the ship and with the carrier guide 125 fitting inside the lower part of the central passage 101 of the load carrier, as shown in FIG. 7. The cable 71 is then lowered by operation of the helicopter cargo cable winch drum 25 until the fitting 73 can be engaged by the lock bolts 116 of the cargo carrier 9. The cargo carrier can then be lifted off the receiving post 11 by operation of the cargo winch drum 25 and/or by upward movement of the helicopter. The cable 3 shown in FIG. 7 need not be used for this operation.

With the load carrier 9 airborne, the helicopter can proceed to the ship to which the load is to be delivered. During this flight, the cargo drum 24 is operated to draw the load carrier up towards the helicopter so that the upwardly divergent flexible entry fitting 103 fits about the complementary part of the lower end of the fitting 7. When the helicopter has reached the second ship, it assumes a position over the receiving post 11 thereon. Typically, the ship will be proceeding against the wind at a steady speed and the helicopter will be on the same heading as the ship and hovering (relative to the ship) at an altitude of about 50 feet above the deck. The messenger winch drum 27 is then operated to pay out the messenger cable and thus lower the cylindrical coupling 31, from an initial position above the catches 61, down through the central passage 101 of the cargo carrier 9 and down to the deck of the ship. The end fitting 53 is attached to the cable 3, and the fitting is resting on the top of the receiving post 11. The messenger cable 29 is seized by the crew of the ship and the coupling 31 is fitted onto the end fitting 53, the bulbous head of the fitting being held between the two catches 47.

The helicopter crew now operate the messenger winch drum 27 to raise the messenger cable and, with it, the cable 3, which is freely laid out on the deck by the ship's crew prior to commencement of the transfer operation. When the end fitting 53 reaches the locking catches 61, its upwardly convergent upper surface acting on the complementary surfaces of the catches enable the end fitting to force the catches apart (the cam ring 65 being at the "unlocked" orientation). The cam ring 65 is next rotated by the helicopter crew through its driving motor, moving the locking catches 61 inwardly and preventing their being forced apart by the end fitting 53 when a tension comes on cable 3.

Cable 3 is now tensioned by a controller located on the ship, and the tension in the cable maintained, preferably by an automatic control, at a predetermined tension. The helicopter pilot by adjustment of the lift provided by his rotor is able to balance this downward force, and it is found that the helicopter will hover in a stable manner at the desired height, say 50 feet, above the deck of the ship.

The load cable 71 is now paid out by operation of the winch drum 25 by the helicopter crew, and the load carrier 9 is lowered steadily between the helicopter and the ship's deck. The load carrier is guided against lateral swinging movement by the cable 3, and should adverse wave conditions cause the ship to rise or to fall suddenly, cable 3 will be taken in or paid out automatically by the winch control system and the helicopter will not be subjected to sudden up or down movements.

When the load carrier 9 approaches the deck of the ship, the upper end of the carrier guide 125 will enter within the upwardly convergent funnel 104 at the lower end of the central passage 101 of the load carrier as shown in FIG. 6, and the weight of the load carrier will be taken by the shock absorber ram 123, hydraulic fluid being driven from the cylinder 122 back into the hydraulic accumulator 133. Before the ram bottoms in the cylinder, the cargo carrier wheels 91 will engage the deck 14 to take the weight of the carrier 9 and the load supported thereby. As the shock absorber ram 123 enters the funnel 104, it engages the bell crank 121 and rocks this crank to operate cylinder 119 to admit pressure fluid to the actuators 118. This moves the two lockbolts 116 outwardly, to free the fitting 73 from the cargo carrier 9. It will be seen that in this way the cargo carrier 9 is entirely free from the cargo cable 71 by the time the ram 123 bottoms in the cylinder 122. The described automatic release feature is much to be preferred to any manual release by the ship crew, since manual release would be dangerous in view of the fact that the cargo carrier 9 could repeatedly be lifted off the receiving post 11 during uncoupling as a result of the heaving motion of the ship.

The helicopter remains tethered to the ship by the cable 3 after cable 71 and cargo carrier 9 have been separated, and cable 3 can now be released by the helicopter crew by rotation of the ring 65 and thus opening catches 61 to drop the cable 3 onto the deck of the ship.

FIG. 9 illustrates the use of a boom 150 extending laterally away from the ship and having the receiving post 11 mounted on it near its outboard end. The sheave 13 is also carried by the boom 150, and the cable 3 extends inboard along the boom to a rope accumulator and constant tension winching system as in the embodiment of the invention described in detail above. The upper surface 151 of the boom is decked so that it will support the wheeled cargo carrier 9, and the boom is pivotally mounted on the vertical axis 155 at its inboard end so that, after the load carrier has been landed and the helicopter untethered, the boom can be swung inboard and the cargo carrier 9 wheeled off the boom (in a lateral direction) onto the deck of the ship.

By the arrangement of FIG. 9, the danger of the load carrier falling onto the deck of the ship, should it for any reason become separated from the helicopter, is removed. When a highly explosive load is being lowered, this is important.

It will be appreciated that during a cargo landing operation it may become necessary to abort the landing operation due to adverse conditions. With the arrangement shown in FIGS. 1 to 7, and with the arrangement shown in FIG. 9, by opening the catches 61 the cable 3 will be freed and will fall to the ship deck, passing through the load carrier 9. However, the load carrier 9 will remain safely supported on the cable 71, and although it probably will commence to sway laterally it can by operation of the winch drum 25 be wound up close to the helicopter, and another attempt made to land the load. An intentional abort can thus be set up at any time by the helicopter pilot, and it is not essential for him to await any permission to abort from the ship controller.

As described in copending Canadian application No. 914,140, it is possible to use a constant tension cable to winch a helicopter down to the deck of a ship at sea, and FIG. 8 illustrates a modification of the helicopter fitting 7 illustrated in FIG. 2, which enables the one fitting to cope with both the transfer of store carriers and the landing of the helicopter on the ship. In a manner similar to that shown in the said copending patent application, the fitting 7 carries a probe 161 which is vertically slidable in the fitting and is biased downwardly towards the position shown in chain-dotted outline by a compression spring 163 acting between a guide piston 165 carried by the upper end of the probe and an abutment 167 on the fitting. The cable 3 can pass up and down inside the hollow probe, and the cargo cable 71 extends through an aperture in the guide piston 165 to one side of the probe. The locking cam ring 65 and the locking catches 61 are both carried by the guide piston 165.

In the description above of the operation of picking up by the helicopter of a cargo carrier 9 from the deck of a ship, the cargo carrier was snatched off the receiving post 11 on the deck of the first ship. If desired, the messenger cable can be lowered and used to winch the constant tension cable 3 up to the helicopter, so that while the cargo carrier is winched up it is guided laterally by the constant tension cable. In some sea conditions this may be desirable, since to snatch the cargo carrier clear of the deck and superstructure of a ship in heavy weather could require the exertion of excessively large forces by the cable 71 and the helicopter fitting 7.

It will be seen that the cargo carrier 9 has a ground clearance of a few inches when it is travelling along the ship deck on its castering wheels 91. The ram 123 can be caused to sink into the cylinder 11 until its upper end is substantially flush with the deck 14. To free the cargo carrier from the carrier guide 125, the cable 3 can be drawn down by its associated constant tension winch system so that the end fitting 53 engages the top of the guide 125 and draws it downwardly close to the deck 14, so freeing the carrier 9. When the receiving post 11 is to be used in loading a cargo carrier 9 onto a helicopter, the cable 3 can be used in a similar manner to hold the guide 125 down until it is desired to let it erect to engage the load carrier.

The supply ship need not carry a constant tension winch system if loads are to be snatched from it, and in such a case a simpler carrier post can be used, or any alternative means of holding the cargo carrier safely until it is properly shackled to the cable 71.

I claim:

1. Load transfer means suitable for effecting the vertical or substantially vertical transfer of objects between an upper station and a lower station subject to unpredictable but limited relative vertical movements, comprising:
   (a) tethering means;
   (b) a cable forming part of the tethering means;
   (c) cable tensioning means also forming part of the tethering means and arranged to maintain the tension in the said cable substantially constant;

(d) a load carrier adapted to carry the objects to be transferred;

(e) guiding means on the load carrier by which the load carrier is caused to pass up or down the constant tension cable and is thereby restrained by that cable against lateral displacement;

(f) winch means at the upper station;

(g) a load cable carried by the winch means and readily connectable at its lower end to the load carrier to support the load carrier;

(h) receiving post means at the lower station to which the constant tension cable extends, the receiving post means being adapted to receive the load carrier as the load carrier reaches the lower station and then to hold the load carrier against lateral displacement when the load cable and the constant tension cable are detached from the load carrier.

2. Load transfer means according to claim 1, in which the tethering means include:

(a) a messenger cable drum carried by the upper station;

(b) a messenger cable wound on that drum;

(c) a first fitting at the free end of the messenger cable;

(d) a second fitting at the upper end of the constant tension cable; the first and second fittings being normally locked together but being free to separate upon the occurrence of an excessive pull from one to the other; and (e) holding means carried by the upper station which can be used to retain positively the second fitting in load carrying relationship to the first station.

3. Load transfer means according to claim 2, and in which the holding means comprise:

(a) a plurality of holding members;

(b) a locking device by which those holding members can be held in a position in which they prevent withdrawal of the second fitting.

4. Load transfer means according to claim 3, and in which:

(a) the holding members include cam followers;

(b) the locking device is a cam ring acting upon all those cam followers; and (c) the cam ring is rotatable between a locked position and an open position.

5. Load transfer means according to claim 1, and in which the upper station is a unitary structure including:

(a) a first winch having a messenger cable drum on which is wound a messenger cable by which the constant tension cable can be drawn up from the lower station to the upper station;

(b) a second winch having a cable drum on which the load cable is carried; and (c) holding means by which the constant tension cable when raised to the first station can be anchored to the unitary structure.

6. Load transfer means according to claim 1, and in which the load carrier includes an upright central tube through which the constant tension cable extends while the load carrier is being lowered from the upper station to the lower station.

7. Load transfer means according to claim 1, and in which the load carrier is supported by the load cable through a shock absorber which is an integral part of the load carrier.

8. Load transfer means according to claim 1, and in which:

(a) an upright central tube forming part of the load carrier accommodates the constant tension cable while the load carrier is being moved between the upper station and the lower station;

(b) a second tube concentric with the central tube and also carried by the load carrier defines between the central tube and this second tube an annular cylinder;

(c) an annular ram fits within this cylinder; and (d) lifting means are provided on the annular ram by which the load cable can readily be attached to and detached from the ram;

the arrangement of cylinder and ram providing a snatch-absorbing and shock-absorbing facility between the load cable and the load carrier.

9. Load transfer means according to claim 1, and in which the load carrier is provided with wheels by which it may readily be moved from the vicinity of the receiving post means.

10. Load transfer means according to claim 1, and in which an upright central tube of the load carrier is adapted to receive the upper end of a post of the receiving post means during the final stages of descent of the load carrier from the upper station to the lower station.

11. Load transfer means according to claim 10, and in which:

(a) the post of the receiving means includes an upright cylinder and a hollow ram acting within that cylinder;

(b) the constant tension cable extends through that hollow ram; and (c) the ram is arranged to cushion the landing of the load carrier after the upper end of the post has entered the upright central tube.

12. Load transfer means according to claim 10, and in which:

(a) a lower part of the post is formed with a shoulder which takes the weight of the descending load carrier; and (b) an upper of the post extending upwardly from the said lower part of the post is in the form of a spring-loaded tube.

13. Load transfer means according to claim 12, and in which a fitting is carried by the upper end of the constant tension cable, and this fitting is arranged to engage the top of the spring loaded tube as the cable is moved downwards, and the fitting then draws the spring loaded tube downwardly out of the central tube to permit removal of the load carrier from the receiving post.

14. Load transfer means according to claim 1, and in which:

(a) the lower station is a ship;

(b) the upper station is a helicopter;

(c) a boom carried by the ship carries the receiving post means towards its outer end;

(d) the boom is capable of horizontal swinging movement over the side of the ship to such a position that, if the load carrier should fall, it will not strike the ship proper.

15. Load transfer means according to claim 5, and in which:

(a) the lower station is a ship;

(b) the upper station is a helicopter;

(c) the unitary structure includes a downwardly extending probe; and (d) this probe is adapted for engagement in a locking device carried by the ship;

whereby the constant tension cable can be used, in the absence of a load carrier, to draw the helicopter down onto the deck of the ship, whereby the locking device engages the probe to anchor the helicopter against further movement in all directions.

References Cited

UNITED STATES PATENTS

| | | | |
|---|---|---|---|
| 1,912,722 | 6/1933 | Perkins | 244—137 X |
| 2,984,455 | 5/1961 | Fischer | 254—172 |
| 3,012,518 | 12/1961 | Sawyer et al. | 214—13 X |

MILTON BUCHLER, Primary Examiner

J. E. PITTENGER, Assistant Examiner

U.S. Cl. X.R.

187—95; 214—13